United States Patent [19]
Tan

[11] Patent Number: 5,687,759
[45] Date of Patent: Nov. 18, 1997

[54] LOW OPERATING POWER, FAST-RESPONSE SERVOVALVE

[75] Inventor: Jinglu Tan, Columbia, Mo.

[73] Assignee: The Curators of the University of Missouri, Columbia, Mo.

[21] Appl. No.: 628,021

[22] Filed: Apr. 4, 1996

[51] Int. Cl.$^6$ .................................... F16K 31/12
[52] U.S. Cl. .................... 137/486; 251/129.18; 137/489; 137/487.5; 137/492.5
[58] Field of Search .................... 251/30.02, 45, 251/129.18; 137/489, 487.5, 486, 492.5; 335/273, 274, 258

[56] References Cited

U.S. PATENT DOCUMENTS

| | | | |
|---|---|---|---|
| 2,339,352 | 1/1944 | Ray | 251/30.02 |
| 2,566,019 | 8/1951 | Dempsey | 251/30.02 |
| 2,708,092 | 5/1955 | Smith . | |
| 2,899,972 | 8/1959 | Matthews | 251/30.02 |
| 2,900,163 | 8/1959 | Nickells . | |
| 3,282,556 | 11/1966 | Hancock . | |
| 3,379,406 | 4/1968 | Greer . | |
| 3,476,353 | 11/1969 | Stampfli . | |
| 3,537,475 | 11/1970 | Pottinger . | |
| 3,791,619 | 2/1974 | Pett . | |
| 3,913,884 | 10/1975 | Rolfe | 251/30.02 |
| 4,911,401 | 3/1990 | Holcomb et al. . | |
| 4,961,441 | 10/1990 | Salter | 251/30.02 |
| 4,967,996 | 11/1990 | Sonoda et al. . | |
| 5,017,099 | 5/1991 | Tan . | |
| 5,213,303 | 5/1993 | Walker . | |

*Primary Examiner*—Denise L. Ferensic
*Assistant Examiner*—Ramyar Farid
*Attorney, Agent, or Firm*—Hovey, Williams, Timmons & Collins

[57] ABSTRACT

A servovalve includes a casing presenting an inlet and an outlet, and a primary valve supported on the casing and including a valve plug that is movable between a closed position blocking flow through the casing, and a plurality of open positions in which the valve plug presents a restriction of variable size for varying the flow. A diaphragm supports the valve plug and includes a first side proximal to the plug and a second side remote from the plug. A control chamber is provided on the first side of the diaphragm, and is connected to the inlet by a pilot inlet passage and to the outlet by a pilot outlet passage. A pilot valve controls the flow of fluid through the pilot outlet passage, and includes a control plug that is movable between a closed position in which the control plug blocks the pilot outlet passage, and a plurality of open positions in which the control plug presents a restriction of variable size within the pilot outlet passage for varying the flow between the control chamber and the outlet. A solenoid moves the control plug between the closed and open positions, and includes an electromagnetic coil, an axially shiftable core on which the control plug is supposed, and a spring assembly for supposing the core within the coil so that the position of the core relative to the coil is established by the force exerted on the core by the electromagnetic field around the coil acting in opposition to the spring assembly.

8 Claims, 1 Drawing Sheet

LOW OPERATING POWER, FAST-RESPONSE SERVOVALVE

BACKGROUND OF THE INVENTION

1. Field of the Invention

The present invention relates generally to valves, and more particularly to servovalves for automatically managing flow in a fluid handling system in response to sensed flow conditions.

2. Discussion of the Prior Art

It is known to provide a fluid handling system including a servovalve, a controller for supplying a control signal to the servovalve, an input mechanism for setting a desired flow condition value that is to be maintained by the servovalve, and a sensor for sensing the actual flow condition downstream of the servovalve. Such controllers typically include a means for comparing the sensed condition and the set condition to adjust the control signal supplied to the servovalve to compensate for the difference between the actual and the desired conditions.

Known servovalves include a valve for controlling the flow of fluid through the servovalve, and an actuator for positioning the valve in a continuous or stepwise fashion. Conventional actuators include fluid cylinders, diaphragms, electromagnetic coils or solenoids, and various electrical motors such as DC, AC or stepper motors. Such actuators are often powered by pressurized fluid, vacuum or pressure, or electrical sources.

Unfortunately, the force needed to move the valve plug in conventional devices proportionally increases with the pressure differential the valve must work against, as well as the valve size which increases with the designed flow capacity. For high pressure differentials or large flow rates, a bulky actuator is required to produce the force necessary to operate the valve. Several disadvantages to this construction exist. For example, high-capacity power sources are required, such as large-current power supplies and high-pressure fluids. In addition, sluggish responses result from the large capacitance and inertia of bulky actuators. High production and operation costs are also associated with actuators of large sizes. These disadvantages create inconvenience for applicants and limit the performance of existing servovalves.

It is known to provide a pilot-controlled valve that reduces the operating power necessary to open and close the valve during operation. An exemplary valve is disclosed in U.S. Pat. No. 3,379,406, to Greer, and includes a body having an inlet and an outlet, a diaphragm having a seating member movable between a closed position blocking flow through the body and an open position permitting flow. A pilot inlet channel provides fluid communication between the inlet and a control chamber above the diaphragm, and a pilot outlet channel extends between the control chamber and the outlet. A solenoid is supported on the valve body and includes a plunger tip movable between a closed position blocking flow through the pilot outlet channel and an open position permitting flow.

During operation of the known pilot-controlled valve, when the plunger tip of the solenoid is in the closed position, fluid is not permitted to flow through the pilot outlet channel and pressure builds up within the control chamber until the pressure on opposite faces of the diaphragm is balanced. A spring is provided within the control chamber for biasing the diaphragm to the closed position when the fluid pressure is balanced in this manner. When the solenoid is actuated, the plunger tip is withdrawn from the pilot outlet channel, allowing flow through the channel so that the pressure within the control chamber drops, allowing the diaphragm to be lifted to the open position by the fluid pressure in the inlet. Thus, the valve is capable of being either opened or closed by supplying a relatively small control signal to the solenoid.

Although the known pilot-controlled valve construction reduces the operating power necessary to open and close the valve, it is not designed to permit control of the valve plug position in a continuous fashion to vary the flow through the valve to compensate for differences between the actual flow conditions and the desired, preset conditions.

OBJECTS AND SUMMARY OF THE INVENTION

It is an object of the present invention to provide a continuously variable servovalve having a construction that allows the valve plug to be positioned anywhere between its fully open and fully closed positions in a continuous manner, eliminates the need for a large power source, is compact in size, and provides a fast response to an electrical control signal so that the servovalve is convenient for use in computer-based fluid handling systems for managing flow in response to sensed flow conditions.

In accordance with these and other objects evident from the following description of a preferred embodiment of the invention, a servovalve is provided which includes a casing presenting an inlet, an outlet, and a partition having an opening that permits fluid flow through the casing. A primary valve is supported on the casing and includes a valve plug movable between a seated position in which the valve plug blocks the opening, and a plurality of open positions in which the valve plug presents a restriction of variable size for varying the flow between the inlet and the outlet, and a diaphragm supporting the valve plug and including a first side remote from the partition and a second side proximal to the partition. A control chamber is defined on the first side of the diaphragm, and a pilot inlet passage provides fluid communication between the inlet and the control chamber. In addition, a pilot outlet passage provides fluid communication between the control chamber and the outlet, and a pilot valve controls the flow of fluid through the pilot outlet passage.

The pilot valve of the inventive construction includes a control plug that is movable between a closed position in which the control plug blocks the pilot outlet passage, and a plurality of open positions in which the control plug presents a restriction of variable size within the pilot outlet passage for varying the flow between the control chamber and the outlet. A positioning means is provided for moving the control plug between the closed and open positions. The positioning means including a solenoid having an electromagnetic coil, an axially shiftable core on which the control plug is supported, and a core biasing means for supporting the core within the coil so that the position of the core relative to the coil is established by the force exerted on the core by the electromagnetic field around the coil acting in opposition to the core biasing means.

Preferably, the servovalve is used in combination with a control means for controlling operation of the positioning means. The control means includes a controller for supplying a variable current to the solenoid, a means for setting a desired flow condition value that is to be maintained by the servovalve, and a sensor means for sensing the actual flow condition downstream from the servovalve. The controller includes a means for comparing the sensed condition and the set condition to vary the current supplied to the solenoid to adjust the flow through the pilot passage and thereby to adjust the flow through the servovalve.

By providing a servovalve in accordance with the present invention, numerous advantages are realized. For example, by providing pilot control of the primary valve movement, the need for a large-capacity external power source and a bulky actuator is obviated in continuously variable servovalve. Because the pilot valve is much smaller than the primary valve, and works against a lower pressure differential, the power needed to operate the pilot valve is relatively small. This simplifies use of the servovalve in fluid handling systems, and increases the number of applications to which the servovalve may be put to use.

In addition, by selecting the design parameters of the servovalve, it is possible to minimize the capacitance of the control chamber and inertia of the movable components, reducing the response time relative to conventional servovalves. The compact size and simple construction of the inventive servovalve also reduces space requirements and permits easy handling and reduced production and operation costs.

BRIEF DESCRIPTION OF THE DRAWING FIGURES

The preferred embodiment of the present invention is described in detail below with reference to the attached drawing figures, wherein:

FIG. 1 is a sectional view of a servovalve constructed in accordance with the preferred embodiment, illustrating the servovalve in a closed position;

FIG. 2 is a sectional view of the servovalve, illustrating the servovalve in one of an infinite number of open positions; and FIG. 3 is a schematic view of a fluid handling system incorporating the servovalve.

DETAILED DESCRIPTION OF THE PREFERRED EMBODIMENT

Figures 1, 2, 3:
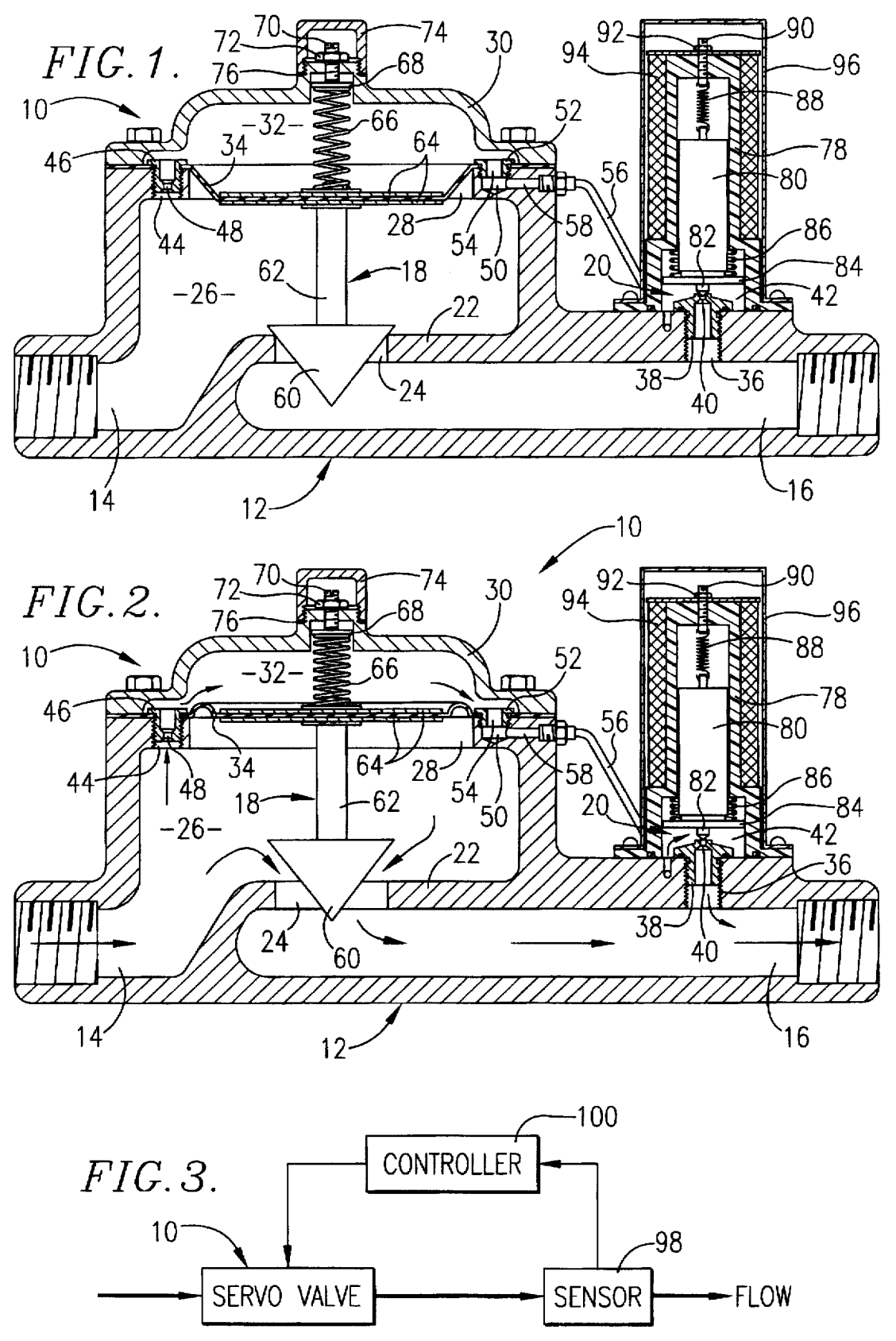

A servovalve constructed in accordance with the preferred embodiment is illustrated in FIGS. 1 or 2, and broadly includes a hollow casing 12 presenting a primary fluid passage extending between a high-pressure inlet 14 and a low-pressure outlet 16, a primary valve 18 for metering the flow of fluid through the passage, and a pilot valve 20 for controlling operation of the primary valve.

The casing 12 presents a partition 22 between the inlet and the outlet, and the partition includes an opening 24 for permitting fluid flow through the primary fluid passage. Preferably, the inlet and outlet are generally aligned with one another and the inlet opens into an inlet chamber 26 that extends partially over the outlet. Thus, the partition 22 forms the floor of the chamber 26 and the opening 24 extends vertically between the chamber and the outlet in a direction transverse to the orientation of the inlet and outlet.

The casing 12 includes an outer wall enclosing the inlet and the outlet. The wall includes an opening 28 extending through the top of the wall and communicating with the chamber 26. The opening 28 is adapted for receipt of the primary valve 18, as described below. A cover 30 is secured to the casing over the opening 28 and encloses the primary valve. The cover and valve together define a control chamber 32 that is separated from the inlet chamber 26 by a diaphragm 34 forming a part of the valve. A threaded opening 36 extends through the outer wall along the outlet 16, and this opening is adapted for receipt of a plug 38 provided with a restricted orifice 40. The pilot valve 20 is secured to the casing adjacent to the outlet and covers the threaded opening 36 so that the pilot valve and casing together define a pilot chamber 42 that communicates with the outlet through the restricted orifice 40.

A relatively small threaded opening 44 extends through the top of the wall on one side of the opening 28 within the control chamber 32, and is adapted for receipt of a plug 46 provided with a restricted orifice 48 that defines a pilot inlet passage between the inlet and the control chamber. A fluid passage 58 extends between the top of the wall and a side of the wall, and includes a threaded opening 50 extending into the control chamber 32. The threaded opening 50 is adapted for receipt of a plug 52 provided with an orifice 54. The fluid passage 58 partially defines a pilot outlet passage between the control chamber 32 and the outlet 16. The pilot outlet passage also includes a conduit 56 that provides fluid communication between the fluid passage 58 and pilot chamber 42 so that a secondary or control flow path is defined between the inlet 14 and the outlet 16 through the pilot inlet passage 48, the control chamber 32, and the pilot outlet passage defined by the fluid passage 58, the conduit 56, the pilot chamber 42, and the orifice 40.

The primary valve includes a valve plug 60 that is movable between a closed position, as shown in FIG. 1, in which the valve plug seats against the partition 22 and blocks the opening 24, and a plurality of open positions, one of which is illustrated in FIG. 2, wherein the valve plug presents a restriction of variable size within the opening 24 for varying the flow between the inlet and the outlet. The plug 60 includes a stem 62 by which the plug is supported on the diaphragm 34. The diaphragm is received over and covers the opening 28 in the top of the wall, and presents a first or upper side remote from the partition and a second or lower side proximal to the partition. Circular disks 64 of rigid material supported on the upper and the lower sides of the disk sandwich the central area of the diaphragm 34. The disks 64 support the valve plug 60 relative to the diaphragm so that movement of the diaphragm into and out of the opening 28 is transmitted to the plug 60.

The diaphragm 34 preferably includes a circumferential flange or lip that extends beyond the opening 28, and this flange is sandwiched between the casing and the cover 30 when the cover is secured to the casing over the opening 28. The underside of the cover presents a cavity that, together with the diaphragm, defines the control chamber 32. The cover cavity also extends beyond the opening 28 and the openings 44, 50 so that the pilot inlet passage and pilot outlet passage communicate with the control chamber 32.

A compression spring 66 is provided within the control chamber 32 between the cover 30 and the diaphragm 3,4, and functions as a primary biasing means for biasing the diaphragm toward the partition 22 and for holding the valve plug 60 seated against the partition when the pressure exerted on the first and second sides of the diaphragm by the fluid is balanced. Preferably, the diaphragm 34 is made of such a material and in such a shape that it provides little resilient resistant force to deformation compared with that provided by the compression spring 66. Thus, the biasing force is approximately proportional to the displacement of the valve plug 60 from the partition 22. The cover 30 includes a central recess within which the upper end of the spring 66 is received, and a movable seat 66 is provided within the recess, against which the upper end of the spring bears. The position of the seat within the recess is adjustable through the use of a screw 70 so that an adjustment means is provided for adjusting the force exerted on the diaphragm by the compression spring. The screw 70 is accessible from outside the casing, and a lock nut 72 is provided for securing the screw in place once the seat has been adjusted to the desired position. A cap 74 is provided for covering the adjustment screw and nut, and also seals the cover against leakage. Preferably, the cap is threaded to the cover, and an elastomeric O-ring or gasket 76 is provided between the cap and the cover to prevent leakage.

The pilot valve 20 controls the flow of fluid through the pilot outlet passage in order to alter the pressure within the control chamber 32 and vary the position of the primary valve plug 60 in the opening 24. Thus, fluid flow is controlled by the primary valve 18 and the primary valve is, in turn, controlled by the pilot valve 20.

The pilot valve includes a hollow tubular stand 78 of magnetically conductive material having a circumferential flange by which the stand is secured to the casing. An elastomeric O-ring is provided in an annular groove formed in the end of the stand and seals the interior of the stand against leakage. The end of the stand opposite to the flange is closed so that the interior of the stand is isolated from the outside of the servovalve.

The interior of the stand is stepped, and includes a large-diameter lower region in fluid communication with the outlet through the restricted orifice, and a small-diameter upper region. An electromagnetic core 80 is received in the upper region and presents a lower end on which a control plug 82 is supported for movement into and out of the restricted orifice 40. The core 80 includes a circular flange 84 that is disposed within the lower region of the stand and defines a seat for a compression spring 86 that is supported between the flange and the stand 78. The compression spring biases the core toward the restricted orifice 40 so that the plug 82 normally closes the orifice, blocking the pilot outlet passage. A tension spring 88 is connected between the upper end of the core 80 and the upper end of the stand 78 for supporting the core within the stand. The force of the tension spring offsets the biasing force of the compression spring 86 by a predetermined amount that is adjustable through the use of a screw 90 that extends through the upper end of the stand and to which the upper end of the spring is secured. A nut 92 is provided for locking the screw in position once the desired tension is achieved.

An upper section of the stand is formed of a reduced outer diameter and is adapted to support a coil 94 of electrically conductive wire so that when current is supplied to the coil an electromagnetic field is generated within the stand, lifting the core within the stand against the bias of the compression spring 86. Thus, a solenoid is defined for moving the control plug between the closed and open positions.

If the current supplied to the coil 94 is relatively small, the electromagnetic force exerted on the core 80 is also small, and the net force exerted on the core by the coil and the springs 86, 88 only lifts the control plug 82 slightly from the restricted orifice 40. However, as the current supplied to the coil is increased, so is the net upward force exerted on the core, and the core is lifted further and further from the restricted orifice until fluid flow through the orifice is substantially unimpeded. An upper end disk is secured to the top of the stand and holds the coil, and a cover 96 is preferably provided which encloses the coil and protects the solenoid.

In order to close the servovalve 10, the current supply to the solenoid coil 94 is interrupted, allowing the compression spring 86 to force the core 80 downward in the pilot chamber 42 and move the pilot plug to the closed position blocking flow through the pilot outlet passage. As a result, pressure within the control chamber 32 builds as fluid continues to flow through the pilot inlet passage between the inlet chamber 26 and the control chamber 32. When the pressure acting on the two sides of the diaphragm 34 approaches equalization, the diaphragm is biased by the compression spring 66 toward the partition, moving the primary plug 60 to the closed position. Thereafter, flow through the servovalve is blocked.

In order to initiate flow through the servovalve, current is supplied to the coil 94, creating a lifting force on the core 80 that opposes the biasing force of the compression spring 86 and lifts the control plug 82 from the restricted orifice. As a result, pressure within the control chamber 32 is at least partially relieved, creating a pressure differential between the first and second sides of the diaphragm 34. This pressure differential acts in opposition to the biasing force of the compression spring 66, lifting the primary plug 66 from the opening and allowing flow through the servovalve.

It is possible to adjust the flow rate of fluid flowing through the servovalve by increasing or decreasing the current supplied to the coil 94. For example, by increasing the current, the lifting force on the core 80 is increased and the control plug 82 is lifted further from the restricted orifice 40. As a result, more pressure is relieved from the control chamber 32, increasing the pressure differential acting across the diaphragm 34. The force resulting from this increased differential lifts the primary plug 60 further from the opening so that the plug presents less of a restriction to flow, increasing the flow rate of the fluid through the servovalve. In contrast, lowering the current supplied to the solenoid coil 94 has the opposite effect of reducing the flow rate of fluid passing through the servovalve.

A fluid handling system incorporating a servovalve is illustrated in FIG. 3, and broadly includes the valve 10, a sensor 98, and a controller 100. The controller and sensor together define a means for controlling operation of the servovalve so that it is possible to automatically manage fluid flow in the system in response to sensed flow conditions. The controller 100 has a means for inputting information and for comparing the input information to the information provided by the sensor so that the current supplied to the solenoid can be adjusted to compensate for differences between the input information and the sensed information. The sensor 98 can be a flow sensor, a pressure sensor, or any other known type of flow condition sensing device, and provides an output signal that can be used by the controller to generate a difference signal that is used to adjust the current supplied to the servovalve 10.

During operation, the desired flow condition, such as a preset flow rate or pressure, is entered into the controller 100, and this value is compared with the flow condition sensed by the sensor 98. The controller adjusts the current supplied to the servovalve 10 in order to compensate for the difference between the preset and the sensed flow conditions so that the servovalve adjusts the flow condition to the preset level. Such control can be carried out continuously.

The response time of the servovalve can be reduced by reducing the volume of the control chamber and the inertia of all moving parts in the apparatus. In addition, it is possible to replace the plugs with plugs provided with orifices of varying restriction in order to change the response characteristics of the servovalve. Thus, the apparatus is easily adaptable for use in various environments.

Although the present invention has been described with reference to the preferred embodiment, it is noted that equivalents may be employed and substitutions made herein without departing from the scope of the invention as recited in the claims.

What is claimed is:

1. A servovalve for controlling fluid flow in a fluid handling system, the servovalve comprising:

a casing presenting an inlet and an outlet, and including a partition having an opening that permits fluid communication between the inlet and outlet;

a primary valve supported on the casing and including
a valve plug movable between a seated position in which the valve plug blocks the opening, and a plurality of open positions in which the valve plug presents a restriction of variable size for varying the flow between the inlet and the outlet, and
a diaphragm supporting the valve plug and including a first side remote from the partition and a second side proximal to the partition;

a means for defining a control chamber on the first side of the diaphragm;

a pilot inlet passage providing fluid communication between the inlet and the control chamber;

a pilot outlet passage providing fluid communication between the control chamber and the outlet;

a pilot valve for controlling the flow of fluid through the pilot outlet passage, the pilot valve including a control plug that is movable between a closed position in which the control plug blocks the pilot outlet passage, and a plurality of open positions in which the control plug presents a restriction of variable size within the pilot outlet passage for varying the flow between the control chamber and the outlet; and a positioning means for moving the control plug between the closed and open positions, the positioning means including a solenoid having an electromagnetic coil, an axially shiftable core on which the control plug is supported, and a core biasing means for supporting the core within the coil so that the position of the core relative to the coil is established by the force exerted on the core by the electromagnetic field around the coil acting in opposition to the core biasing means;

wherein the solenoid includes a stand on which the coil is wound and within which the core is received the core biasing means including a compression spring extending between the core and the stand for biasing the core in a direction opposite to the direction of the force exerted on the core upon energization of the coil, and a tension spring extending between the core and the stand for biasing the core in a direction opposite to the direction of bias of the compression spring, the tension spring defining an adjustment means for adjusting the net spring force exerted on the core, the tension spring being accessible from outside the stand.

2. A servovalve as recited in claim 1, further comprising: control means for controlling operation of the positioning means, the control means including a controller for supplying a variable current to the solenoid, a means for setting a desired flow condition value that is to be maintained by the servovalve, and a sensor means for sensing the actual flow condition downstream from the servovalve, the controller including a means for comparing the sensed condition and the set condition to vary the current supplied to the solenoid to adjust the flow through the pilot passage and thereby the flow through the servovalve.

3. A servovalve as recited in claim 1, further comprising a primary biasing means for biasing the diaphragm toward the partition and for holding the valve plug seated against the partition when the pressure exerted on the first and second sides of the diaphragm by the fluid is balanced.

4. A servovalve as recited in claim 3, wherein the primary biasing means includes a compression spring supported within the control chamber and bearing against the diaphragm, and an adjustment means for adjusting the force exerted on the diaphragm by the compression spring, the adjustment means being accessible from outside the casing.

5. A servovalve as recited in claim 1, wherein the pilot inlet passage includes structure defining a restricted orifice, the structure being removable from the casing.

6. A servovalve as recited in claim 1, wherein the pilot outlet passage includes structure defining a restricted orifice, the structure being removable from the casing.

7. A servovalve as recited in claim 2, wherein the sensor means includes a pressure sensor for sensing the fluid pressure downstream from the servovalve.

8. A servovalve as recited in claim 2, wherein the sensor means includes a flow sensor for sensing the flow rate of fluid downstream from the servovalve.

* * * * *